United States Patent
Koerner

(10) Patent No.: US 6,955,190 B2
(45) Date of Patent: Oct. 18, 2005

(54) REINFORCING WRAP FOR PLASTIC PIPE

(75) Inventor: Dennis W. Koerner, Memphis, TN (US)

(73) Assignee: Ring Industrial Group, L.P., Oakland, TN (US)

( * ) Notice: Subject to any disclaimer, the term of this patent is extended or adjusted under 35 U.S.C. 154(b) by 0 days.

(21) Appl. No.: 10/290,261

(22) Filed: Nov. 8, 2002

(65) Prior Publication Data

US 2004/0089361 A1 May 13, 2004

(51) Int. Cl.$^7$ .................................................. F16L 57/00
(52) U.S. Cl. ........................ 138/110; 138/125; 138/149; 138/178; 405/45
(58) Field of Search .......................... 138/110, 99, 149, 138/129, 150, 105, 112; 206/523, 150, 443, 584; 220/902; 405/43, 45

(56) References Cited

U.S. PATENT DOCUMENTS

| | | | |
|---|---|---|---|
| 2,962,402 A | | 11/1960 | Sweeney |
| 3,141,480 A | | 7/1964 | Ralston |
| 3,237,796 A | | 3/1966 | Callahan |
| 3,294,225 A | | 12/1966 | Kenyon |
| 3,304,219 A | * | 2/1967 | Nickerson .................. 428/327 |
| 3,483,896 A | * | 12/1969 | Grosh ......................... 138/141 |
| 3,552,445 A | | 1/1971 | Andrews |
| 3,607,511 A | * | 9/1971 | Grosh ......................... 156/173 |
| 3,948,294 A | | 4/1976 | Magarian et al. |
| 3,999,653 A | * | 12/1976 | Haigh et al. ................. 206/584 |
| 4,040,165 A | * | 8/1977 | Miessler et al. .............. 29/458 |
| 4,318,427 A | * | 3/1982 | Cross, Jr. .................... 138/149 |
| 4,348,243 A | | 9/1982 | Craubner |
| 4,880,119 A | * | 11/1989 | Simon ......................... 206/584 |
| 5,015,123 A | | 5/1991 | Houck et al. |
| 5,051,028 A | * | 9/1991 | Houck et al. ................. 405/45 |
| 5,099,889 A | | 3/1992 | Ratzlaff |
| 5,226,557 A | | 7/1993 | Nelson |
| 5,378,357 A | * | 1/1995 | Houck et al. ................ 210/170 |
| 5,618,263 A | * | 4/1997 | Alivizatos ...................... 602/6 |
| 6,173,483 B1 | | 1/2001 | Houck et al. |
| 6,286,557 B1 | | 9/2001 | May |
| 6,315,493 B2 | * | 11/2001 | Malone et al. ................ 405/45 |
| 6,341,626 B1 | | 1/2002 | Davenport et al. |
| 2004/0057797 A1 | * | 3/2004 | Ring ............................ 405/46 |
| 2004/0089359 A1 | * | 5/2004 | Koerner ...................... 138/105 |

* cited by examiner

Primary Examiner—James Hook
(74) Attorney, Agent, or Firm—Sughrue Mion, PLLC

(57) ABSTRACT

The combination of a flexible pipe, e.g. plastic, and a reinforcing member mounted around the pipe to strengthen the pipe and to enhance its ability to resist deformation under load. In one embodiment the reinforcing member includes a flexible perforated plastic netting containing an aggregation of lightweight elements such as expanded polystyrene beads capable of wrapping around the pipe, preferably in helical fashion along the length of the pipe. In another embodiment, a number of members are mounted on the pipe in longitudinally extending fashion. In all embodiments, the beads provide drainage around the pipe when it is placed in a trench and obviate the need for gravel normally used in conventional systems.

5 Claims, 3 Drawing Sheets

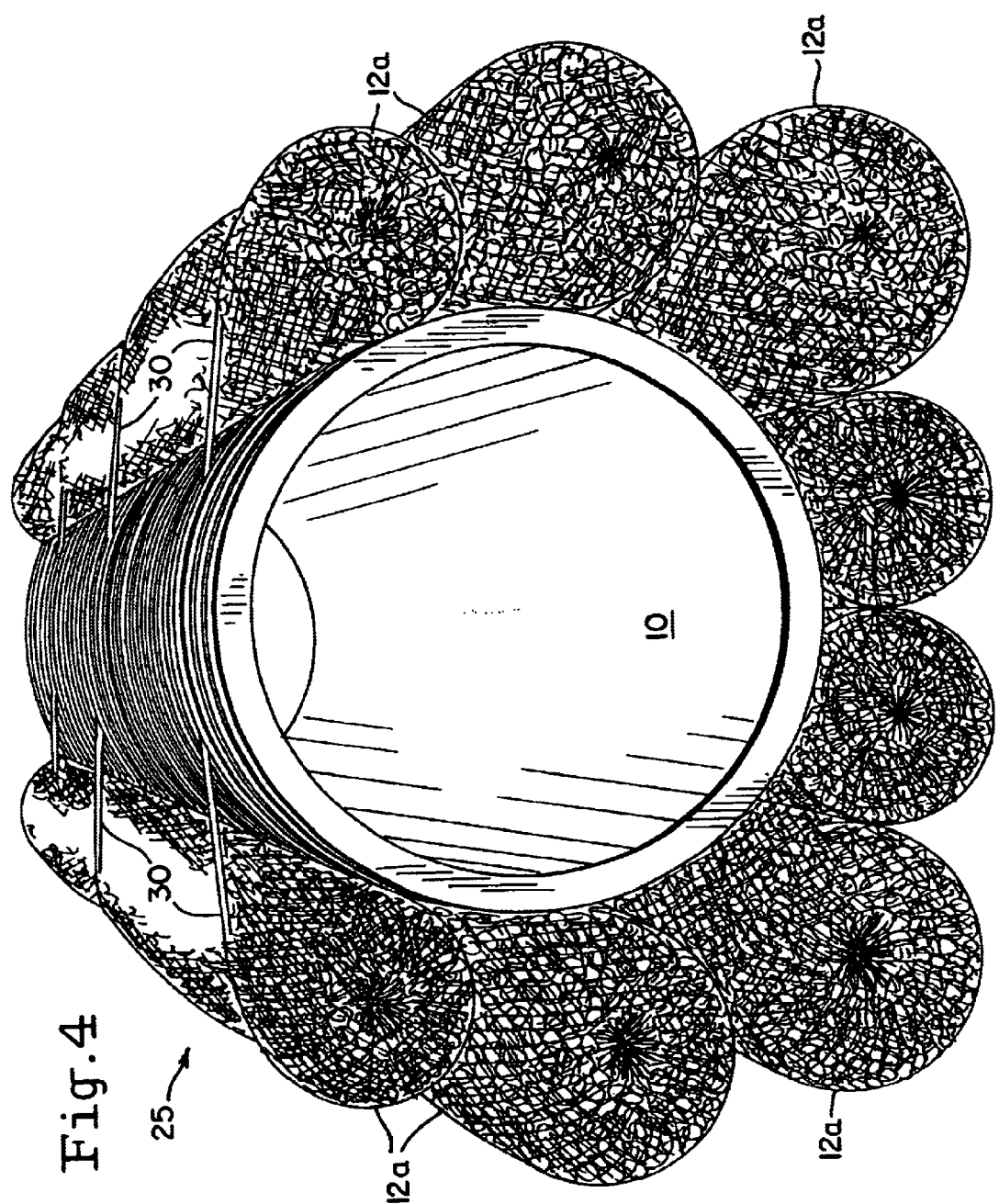

US 6,955,190 B2

REINFORCING WRAP FOR PLASTIC PIPE

BACKGROUND OF THE INVENTION

This invention relates generally to large diameter flexible pipe for example, plastic pipe, used in underground drainage systems and more particularly to a pipe having a reinforcing and strengthening preassembled drainage line member containing lightweight aggregate placed on the outside of the pipe to prevent deformation of the pipe under load and to resist deflection and provide impact resistance during shipping and handling of the pipe and placement of the pipe into a trench. Normally gravel is placed around the pipe in the trench. The lightweight aggregate replaces the gravel and enhances drainage around the pipe while providing structural support thereto.

In recent years thin walled, cylindrical plastic pipe constructed of high density polyethylene (HDPE) has been successfully substituted for prior concrete and metal pipe in constructing drainage systems for culverts, cross drains, storm sewers, land fills, and other public and private construction. The diameter of the larger pipes range from about 12 inches to 60 inches and are manufactured in about 20 foot lengths. Depending upon the application the pipes may be corrugated both internally and externally, corrugated externally with a smooth interior surface or provided with both smooth interior and exterior surfaces. The depth at which these pipes can be buried is from about 12 inch soil cover to as much as 60 foot soil cover.

These large diameter plastic pipes are subjected to various forces during transit from a manufacturing facility or a warehouse to a job site and while the pipe is being handled at the job site which tend to distort the pipe from its normal circular cross section. Although the pipe is reasonably rigid the forces may tend to flatten, bend or dent the pipe. Similarly, once the pipe is installed in the underground trench and the pipe is then covered with the backfill material, the weight of that material may deform the pipe from its normal circular cross section to an out of round condition. In addition, once in place and covered by gravel and fill, vehicles driving over the pipe, e.g. when the pipe is buried under a road, subject the pipe to substantial loads which tend to deform the pipe.

It would be advantageous to provide such large diameter flexible plastic pipe with a system which alleviates those deflection and deformation problems while facilitating drainage around the pipe and the invention as described hereinbelow was developed for that purpose.

SUMMARY OF THE INVENTION

Accordingly the primary object of this invention is to provide a simple, inexpensive reinforcing and drainage system which helps maintain the structural integrity of a large diameter flexible pipe, resists deflection and deformation of the pipe under load and replaces the gravel to provide for drainage around the pipe.

This object is accomplished by providing a reinforcing system comprising at least one preassembled drainage line member which includes an outer flexible perforated sleeve member, e.g. tubular nylon netting or mesh, filled with loose aggregate in the form of lightweight materials, for example, a plurality of crush resistant expanded polystyrene (EPS) beads tightly bound within the net, the member being secured on the outside surface of the pipe to strengthen the pipe and to provide drainage around the pipe when it is placed in a trench. A thin walled flexible plastic conduit may be provided within the member, with the lightweight materials surrounding the conduit and being bound thereby by the plastic netting.

Further objects and advantages of the invention will become apparent from reading the following detailed description of the invention wherein reference is made to the accompanying drawings.

BRIEF DESCRIPTION OF THE DRAWINGS

FIG. 4 is a generally perspective view of a second embodiment of the invention in which reinforcing members extend longitudinally on the outside surface of a pipe.

DETAILED DESCRIPTION OF THE INVENTION

Figure 1:
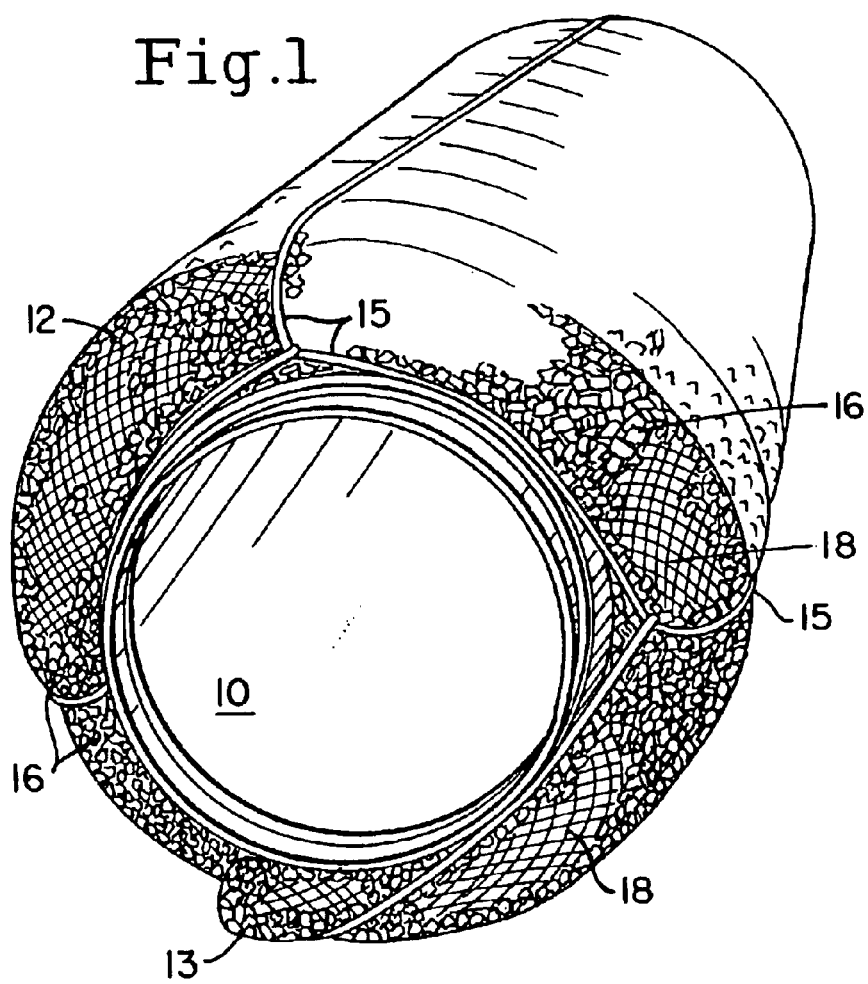
FIG. 1 is a generally perspective view illustrating a first embodiment of the invention in which a reinforcing member is wrapped helically along the length of a large diameter pipe to strengthen the pipe.
Figure 1A:
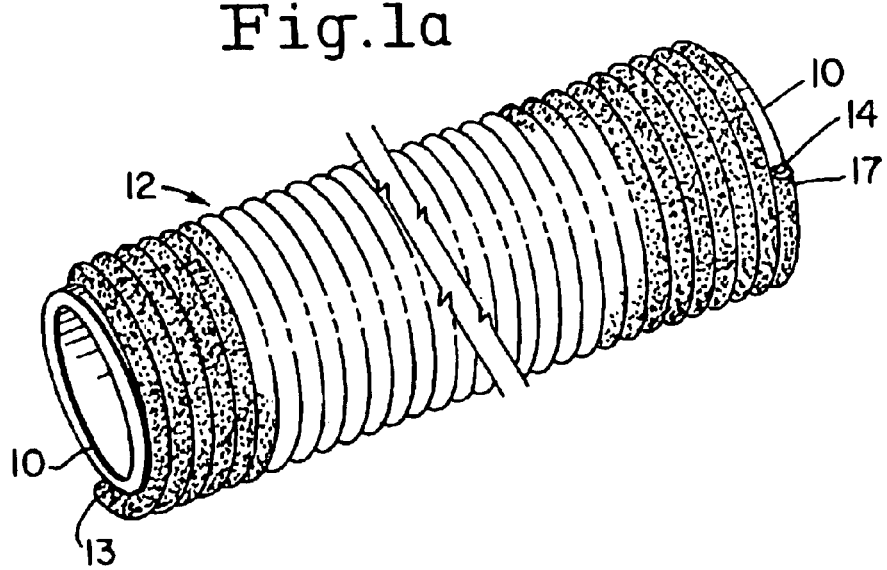
FIG. 1a is a schematic illustration of the embodiment of FIG. 1.

As illustrated in FIG. 1 and FIG. 1a, the first embodiment of the invention includes a large diameter plastic pipe 10 constructed for example from HDPE material having a predetermined length, for example about 20 feet, and a reinforcing flexible preassembled drainage line member 12 tightly helically wound around the outside of pipe 10 from end to end of the pipe to strengthen the pipe and to enhance the ability of the pipe to resist deflection and deformation under load.

Figure 2:
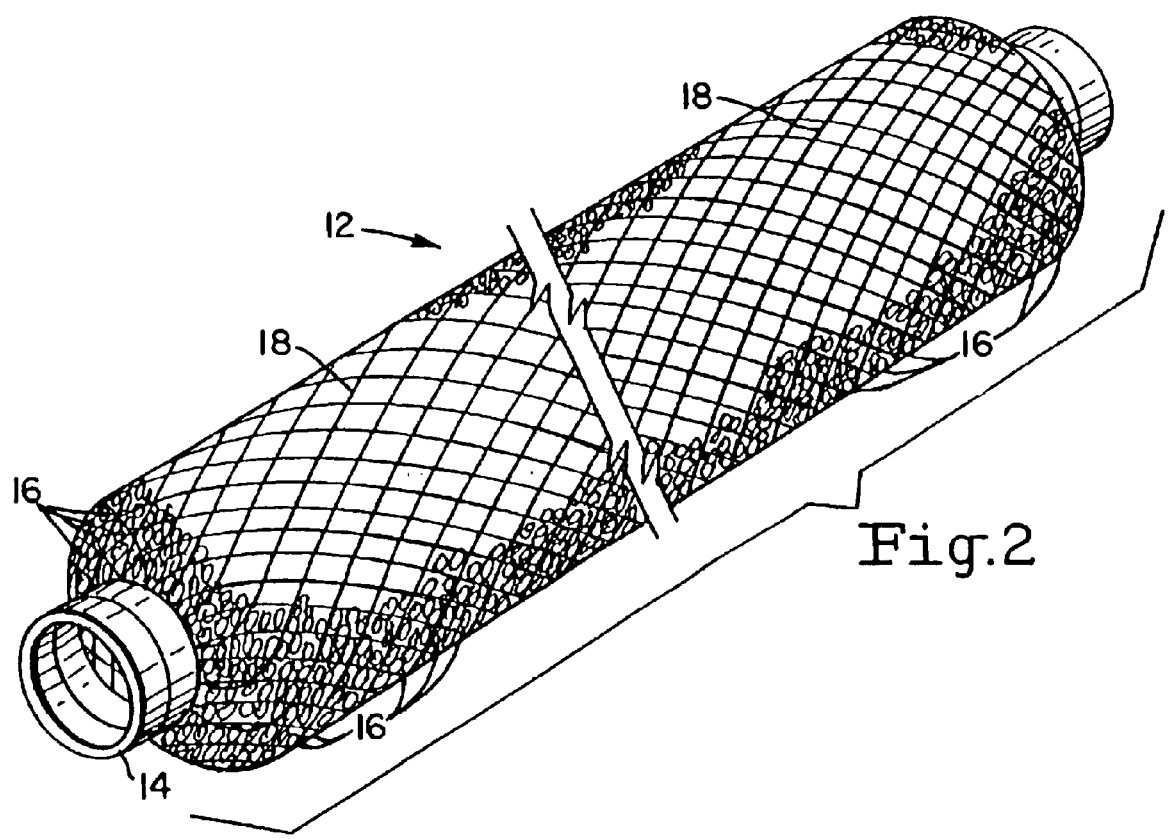
FIG. 2 is a perspective view of one form of the reinforcing member surrounding the pipe in FIG. 1.

Flexible reinforcing member 12 may be constructed as illustrated in FIG. 2 and includes a central flexible corrugated conduit 14 surrounded by a plurality of lightweight plastic aggregate 16 held in place by a surrounding plastic net or mesh 18 and suitably tied at its end to conduit 14. Member 12 can be manufactured to any desired length to accommodate any length and diameter of pipe 10.

Figure 3:
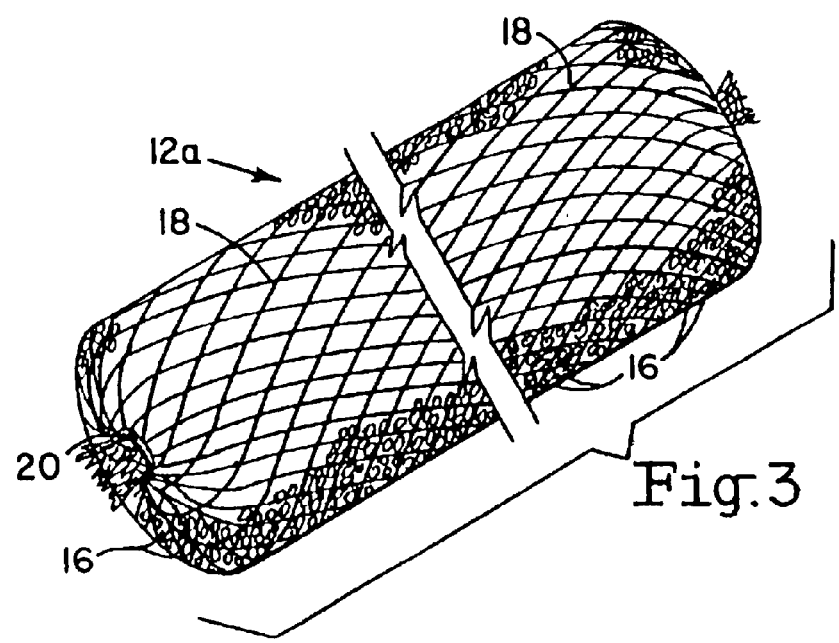
FIG. 3 is a perspective view of another form of the reinforcing member.

Alternative member 12a illustrated in FIG. 3 is essentially identical to member 12 in FIG. 2 except that conduit 14 has been omitted and each end of net 18 is suitably tied by a fastener 20 to hold the aggregate 16 within. The outer diameter of members 12 and 12a can vary, e.g. between 3 inches and 36 inches depending on the diameter of the pipe 10 which can be as large as 6 feet or more.

The reinforcing aggregate units illustrated in FIGS. 2 and 3 are the same as those illustrated in FIGS. 2 and 3 of U.S. Pat. No. 5,015,123 which is owned by the same assignee of this invention. Those members can be manufactured by the method and apparatus described in the '123 patent or preferably by the method and apparatus illustrated in U.S. Pat. No. 6,173,483 which is also owned by the assignee of this application. The disclosures of the '123 patent and the '483 patent are incorporated herein by reference in their entirety.

The aggregate 16 are discrete water impervious, water resistant, lightweight plastic elements, preferably expanded polystyrene (EPS) beads of the type which are illustrated in U.S. Pat. No. 6,467,996 which is also owned by the assignee of this application. Beads 16 are firmly bound within net 18 but yet member 12 is flexible enough so that it may be tightly wrapped around pipe 10 in helical fashion, preferably with adjacent coils abutting each other. Each end of member 12 may include a generally cylindrical coil 13 at an end of pipe 10. Member 12 can be suitably fastened on pipe 10 e.g. by straps 15.

As mentioned above, the reinforcing wrap member 12 which is wound tightly around pipe 10 strengthens the pipe and enhances its ability to resist deflection, for example, bending, denting, or flattening of the pipe during handling and transportation and deformation under load when it is placed into the trench where it is subjected to the load of the backfill material which is placed on top thereof and forces caused by vehicles passing thereover. In addition, during transportation wherein a number of pipes are normally placed side by side and on top of each other on a flat bed, the reinforcing coil member 12 minimizes and cushions any impact between adjacent pipes 10 and thereby prevents any indentation or marring or other damage to the outside surface of the pipes and helps maintain the structural of integrity of the pipes.

The reinforcing aggregate members 12 are very light in weight, easy to handle, and add very little cost to the pipe itself while substantially increasing the strength of the pipe. In addition, when pipe 10 and member 12 attached thereon are placed in a trench, the EPS aggregate beads 16 provide drainage around the pipe and structurally support the pipe in use. Beads 16 replace gravel which has been used in prior conventional installations. As a result the invention reduces substantial labor and material costs in constructing drainage systems.

The member 12 may be quickly and easily attached to a pipe 10 following the manufacturing of the pipe by simply first attaching one end of member 12 to one end of pipe 10, slowly rotating pipe 10 while moving the remainder of the wrap linearly along the rotating pipe so as to wind the wrap in helical fashion around the pipe, and then finally attaching the other end of the wrap 17 around the other end of the pipe. Although it is preferable that adjacent coils abut each other, the pitch between adjacent coils of the wrap 12 can be varied by varying either the speed of rotation of pipe 10 or the speed of linear travel of the wrap along the pipe, or both.

Thus, it is clear that the invention of FIG. 1 accomplishes the objectives set forth initially hereinabove and provides a simple, inexpensive reinforcing and strengthening system for large diameter plastic pipes. While the reinforcing system is illustrated as constituting the helical wrap member 12, in some applications the system may include a plurality of separate cylindrical wrap members spaced along the length of pipe 10.

The second embodiment 25 of the invention illustrated in FIG. 4 includes a plurality of members 12 or 12*a* secured circumferentially around the outside of the pipe, each member extending longitudinally from one end of the pipe to the other. The members are secured to pipe 10 by straps 30 which wrap circumferentially around the members and the pipe.

As with the first embodiment of FIG. 1, the longitudinally extending members 12 or 12*a* of embodiment 25 strengthen the pipe. When the assembly is placed in a trench, the members containing beads 16 provide drainage around the pipe, replacing the gravel and thereby reducing labor and material costs.

The longitudinally extending members 12 in FIG. 4 may be selectively positioned around the circumference of pipe 10 to strengthen a weak area in a pipe installation. For example, when two pipes are placed side by side in a trench in abutting relationship, an open area or haunch 19 formed below the line of contact of the pipes, the diverging side walls of the bottom of the pipes, and the bottom of trench. This open area may weaken the pipe assembly which may deflect and deform under load. To avoid this, members 12 may be strategically positioned on one or both pipes to fill that open area and thereby provide full support for the pipes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. In combination with a flexible pipe, reinforcing means wrapped around said pipe to strengthen said pipe and to enhance the ability of said pipe to resist deformation under load, said reinforcing means comprising a preassembled drainage line member formed separately from said pipe, said drainage line member including a flexible perforated tubular sleeve member containing an aggregation of lightweight elements, and means mounting said drainage line member on said pipe with said sleeve member being helically wound around the outside of said pipe.

2. The combination of claim 1, wherein said sleeve member is a perforated plastic netting and said lightweight elements are expanded polystyrene beads.

3. The combination of claim 2, said reinforcing means further comprising a flexible conduit extending through said plastic netting and surrounded by said beads.

4. The combination of claim 1, said reinforcing means further comprising a flexible conduit extending through said sleeve member and surrounded by said lightweight elements.

5. The combination of claim 1, wherein said pipe is made of plastic.

\* \* \* \* \*